April 2, 1957   J. P. HARVEY ET AL   2,787,361
LEMON-TURNING CONVEYOR

Filed Dec. 13, 1955   2 Sheets-Sheet 1

INVENTORS
John P. Harvey
Floyd S. Smith
BY Schemm and Knowles
ATTORNEYS

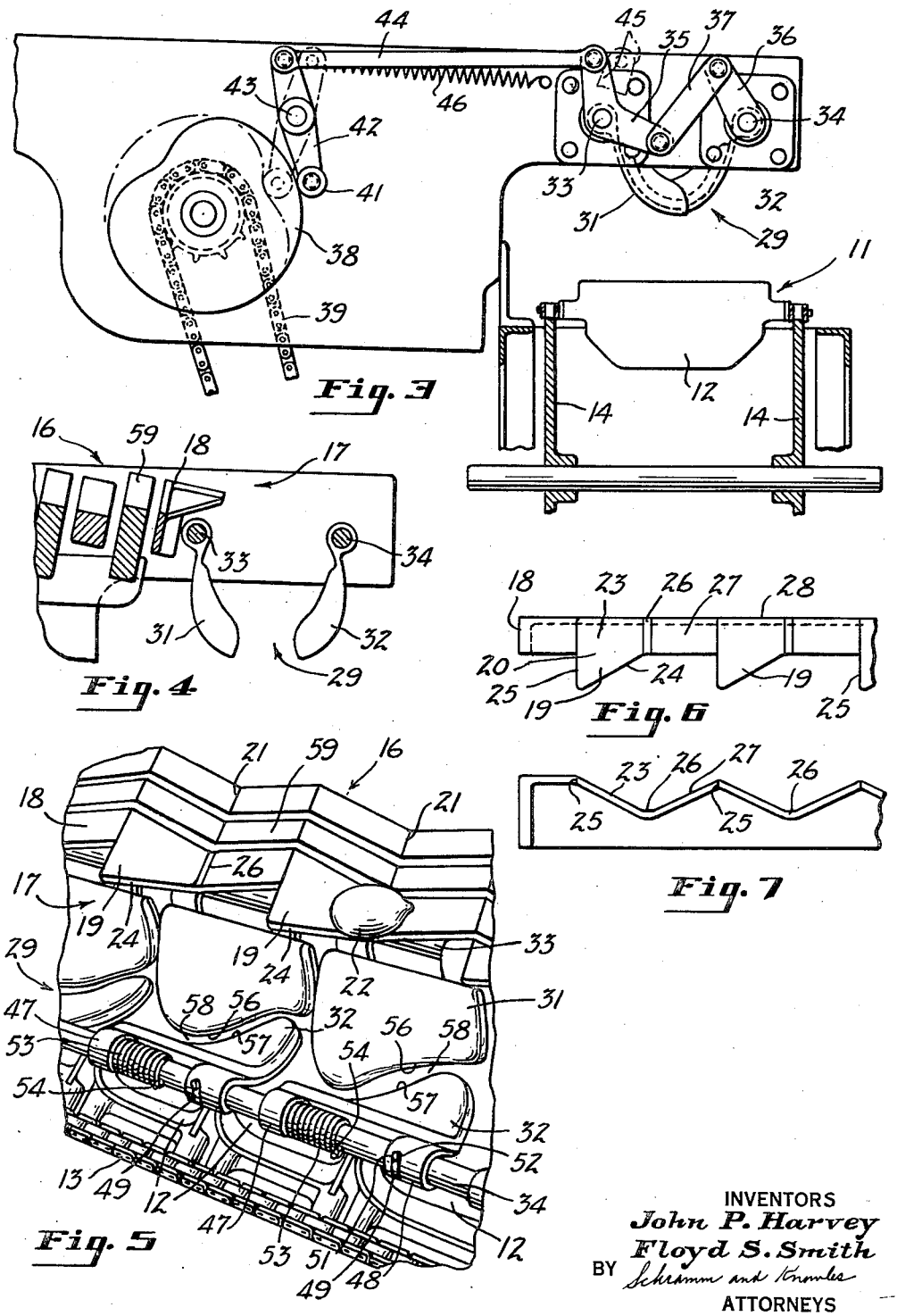

United States Patent Office 2,787,361
Patented Apr. 2, 1957

2,787,361

LEMON-TURNING CONVEYOR

John P. Harvey and Floyd S. Smith, Grand Rapids, Mich., assignors to Electric Sorting Machine Company, Grand Rapids, Mich., a corporation of Michigan Application December 13, 1955, Serial No. 552,858

7 Claims. (Cl. 198—32)

The present invention relates to improvements in the sorting of discrete articles and especially to arrangements for conveying articles having a greater dimension along a longitudinal axis than transversely.

An object of the invention is to convey fragile articles such as lemons from a supply point to an inspection chamber in an optical or photoelectric type of sorting machine in such a manner that the lemons travel in a direction transverse to the axis of the lemon or to the line joining the lemon tips.

A further object of the invention is to convey fragile articles, such as lemons, in such a manner that the tips of lemons do not strike conveyer parts or other lemons and are not otherwise subjected to concussion.

Still another object of the invention is to handle lemons in such a manner in a conveyer that the maximum quantity of lemons may be carried for given linear speed of travel, to which end the lemons must be carried with their maximum dimension transverse to the direction of travel.

Still another object of the invention is to turn the axes of articles such as lemons when they are transferred from one conveyer to another travelling in a different direction in order to preserve the relation of the axis of the lemon to the direction of travel.

Still another object of the invention is to transfer fragile articles such as lemons from one conveyer to another effectively and without injury to the lemons and to cause lemons travelling in parallel rows to be transferred to a path of travel in a single row at increased linear speed.

Other and further objects, features and advantages of the invention will become apparent as the description proceeds.

In carrying out the invention in accordance with a preferred form thereof, a notched walking board type of conveyer is employed having a plurality of notches providing parallel rows in which fragile articles such as lemons may be conveyed progressively from an input end to an output end of the walking board conveyer. A mating pan conveyer is provided having receiving pans travelling horizontally in a path below the output end of the walking board conveyer and in a direction transverse to the direction of travel of the lemons in the walking board conveyer. In order to synchronize accurately the timing of the deposit of the groups of lemons falling off the output end of the walking board conveyer into the receiving pans, an intermediate gate system is provided. The intermediate system comprises a plurality of synchronously operated gates below the output end of the walking board conveyer well above the line of travel of the receiving pans. There is an intermediate gate for each row of the walking board conveyer. They are cup shaped, each consisting of a pair of concave leaves pivotally mounted and arranged to open at a predetermined time in relation to the travel of the receiving pans such that each pair of leaves in which a lemon has been deposited from the walking board conveyer opens at the appropriate instant in relation to the position of the receiving pans. In consequence, an entire group of lemons corresponding in number to the number of rows in the walking board conveyer is deposited in the same number of receiving pans of the mating pan system.

Means are provided at the end of the walking board conveyer for partially turning each lemon as it falls off the end of the walking board conveyer to cause it to fall into the closed intermediate gate with its axis in a horizontal plane but oblique with respect to the original direction of travel. The intermediate gate leaves are so constructed so as to cause a further turning of the axis of the lemon as it is released therefrom so that each lemon will be deposited in the receiving pan of the mating pan conveyer with its axis still horizontal but transverse to the direction of motion of the receiving pans and therefore substantially perpendicular to the direction of the axes of the lemons while they were travelling in the walking board conveyer.

A better understanding of the invention will be afforded by the following detailed description considered in conjunction with the accompanying drawings, in which:

Figure 3 is a fragmentary side elevation of the apparatus of Figure 1 partially in section, as viewed from line 3—3 of Fig. 1;

Figure 4 is a fragmentary view of a portion of the apparatus of Figure 3 showing an intermediate gate in the open position instead of the closed position, together with a fragmentary view of the output end of the walking board conveyer;

Figure 5 is a perspective fragmentary view of the portion of the apparatus including the output end of the walking board conveyer and the intermediate gate system;

Figure 6 is a fragmentary plan view of the end board of the walking board conveyer; and Figure 7 is a fragmentary elevation illustrating the portion of the apparatus shown in Figure 6.

Like reference characters are utilized throughout the drawing to designate like parts.

The fragile article conveying system and arrangement for turning lemons in the conveyer system is especially adapted for use in photoelectric sorting machines of the type disclosed in the co-pending application of Lloyd A. Kaufman, Serial No. 539,363, and may be employed in photoelectric sorting machines having a principle of operation similar to that of the apparatus disclosed in the co-pending application of Michael C. Hoover, Lloyd A. Kaufman and Floyd S. Smith, Serial No. 461,072, filed October 8, 1954.

In such apparatus there is a mating pan conveyer consisting of a plurality of receiving pans traveling along a horizontal path or run to a vertical path or run; and in the vertical run the receiving pans travel in juxtaposition to a belt or chain carrying closing pans to form pairs of mating pans for lowering objects, contained one in each pair of mating pans, to a point above the entry end of a viewing chamber or photoelectric sorting head for a gravity or free fall type of photoelectric sorting machine.

Figure 1:
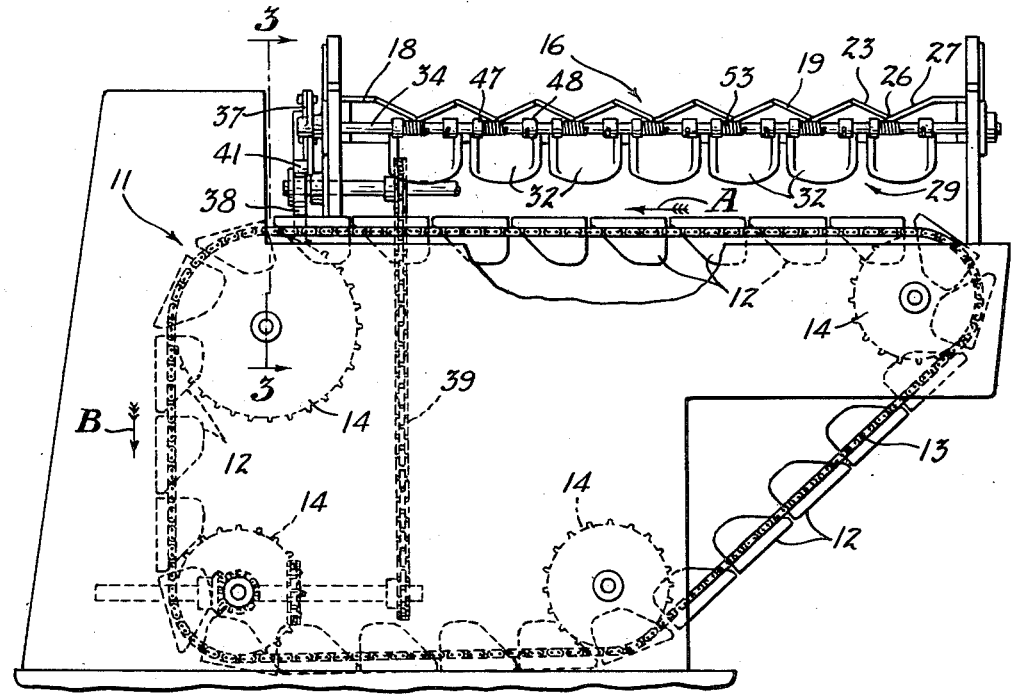
Figure 1 is a fragmentary end elevation of a sorting machine and conveyer system including an end view of a walking board conveyer, with a view of a set of intermediate gates and a receiving pan conveyer forming a part of a mating pan conveyer.

In Figure 1 there is illustrated a receiving pan conveyer system 11 consisting of a plurality of individual receiving pans 12 carried on chain links 13 supported on sprockets 14. The sprockets are provided with drive mechanism, not shown, and arranged for causing the receiving pans 12 to travel horizontally in the direction indicated by the arrow "A"; after which they travel downwardly in a vertical run in the direction indicated by arrow "B." While travelling in the direction indicated by the arrow "B," the pans 12 move in juxtaposition to closing or holding pans, not shown, since the holding pans do not constitute a part of the present invention.

In order that fragile articles such as lemons may be delivered to the receiving pans 12 at such a rate of speed as to permit the pans 12 to travel at the maximum rate of speed at which such pans may handle lemons safely and without damage, and they may be received and photoelectrically inspected in an inspection chamber having photoelectric sorting head, a plurality of rows of lemons are caused to travel toward the horizontal run of the receiving pan conveyer system 11. For this purpose a multiple row walking board type of conveyer 16 is employed consisting of notched boards, alternative ones of which are stationary. The remaining boards interleaved with the stationary boards are movable. The movable boards are mounted to move up and down, or very nearly in a vertical direction. Moreover, the line of top edges of the boards slopes downward toward the output end so that the articles in the walking board conveyer progress from the input end, which is slightly higher, to the output end 17 illustrated in Figures 4 and 5. The general arrangement of the boards of the walking board conveyer and the mechanism for causing the movable boards to move up and down does not constitute a part of the present invention but may be as shown in the aforesaid Kaufman application, or the Hoover, Kaufman, Smith application, Serial No. 461,072. The walking board conveyer disclosed in the present application and constituting a part of the present invention differs from conventional walking board conveyor, however, in that it has an output end board, preferably a stationary end board 18, formed with a plurality of wings 19 and has one wing 19 for each notch or valley 21 formed in the walking board conveyer. It will be understood that each notch or valley in the walking board represents one of the rows in which fragile articles such as lemons 22 may travel. As shown, the end board 18 is a stationary board although the invention is not limited thereto. In the arrangement illustrated the end board 18 is cast, or otherwise formed, from suitable metal so that the wings 19 and the remainder of the notched board 18 constitute an integral structure. It is to be understood that the invention is not limited thereto, however, and does not exclude the use of a fabricated construction in which wings 19 are separately formed as flat sheet metal plates, angles or the like and secured to the walking board. Each wing 19, whether it is formed integrally with the walking board or secured to a conventional type walking board, is triangular in shape lying along a plane 20 forming a continuation of the plane of the surface of one side 23 of the notch or valley 21 of walking board 16. The wing 19 has an edge 24 which is oblique to the face of the walking board 18 and an edge 25 which is perpendicular to the face 28 of the walking board 18. The wing 19 does not, however, extend beyond the furrow 26 separating the side 23 of each walking board notch or valley from the opposite side 27.

Below the lower or output end 17 of the walking board 16 is an intermediate gate system consisting of a plurality of intermediate gates or cups 29 each comprising a pair of leaves 31 and 32. The leaves 31 are secured to a shaft 33 and the leaves 32 are secured to a shaft 34, the shafts 33 and 34 being oppositely rotatable through small angles for moving the leaves 31 and 32 from a closed position as illustrated in Figure 3 to an open position as illustrated in Figure 4 and vice versa. For producing symmetrical rotation of the leaves a linkage is provided comprising cranks or levers 35 and 36 secured to the shafts 33 and 34, respectively, with their ends pivotally connected to a diagonal rod or cross link 37.

Suitable means are provided for oscillating one of the shafts 33 about its axis. As illustrated in Figure 3, the means for oscillating shafts 33 and 34 to open and close the intermediate gate comprises a cam 38 continuously driven by a chain and sprocket drive 39 to actuate a cam follower 41 at the end of a lever 42 a pivot pin 43 and connected by a connecting rod 44 to a lever arm 45 secured to the intermediate gate shaft 33. The lever arms 35 and 36 may, if desired, constitute a bell crank. Suitable means such as a spring 46 is provided for biasing the lever 42 to a position with the cam follower 41 bearing against the surface of the cam 38. As illustrated in the drawings, the intermediate gate leaf 31 is rigidly secured to the shaft 33.

Preferably, however, a yielding mechanism is provided for supporting one of the two leaves of the pair 31 and 32 in order to avoid possible damage to the lemons 22 or jamming of the apparatus in case of faulty movement of one of the articles being transported. To this end, as illustrated in Figure 5, a resilient mounting of the leaves 32 on the shaft 34 is provided. The leaves 32 are formed with straps 47 and 48 curved around the shaft 34 to provide a slip fit, one of the straps 48 having a slot 49 cooperating with a pin 51 driven radially into the shaft 34 to provide limit stops for the relative rotation of the shaft 34. The leaf 32 is resiliently mounted, holding the leaf 32 in the angular position on the shaft 34 with one end 52 of the slot 49 against the pin 51. A coil spring 53 is provided, secured at one end 54 to the shaft 34 and at the other end to the strap 47 of the leaf 32.

The leaves 31 and 32 of each pair of intermediate gate leaves are not symmetrical with respect to each other; but as shown they have curved edges 56 and 57, respectively. Each curved edge 56 and 57 extends generally obliquely toward the supporting shaft of the opposite leaf when the leaves 31 and 32 are in the closed position with their curved edges 56 and 57 towards each other so as to leave an oblique crevice-like aperture or slot 58 between the two leaves. Leaves 31 and 32 are so shaped that they interfit except for leaving the slot or aperture 58.

Preferably, as a further protection against possible abrasion, concussion, or other damage to fragile articles such as lemons, the intermediate gate leaves 31 and 32 and the receiving pans 12 are lined with a shock absorbent material such as polyurethane foam such as described in greater detail in the co-pending application of John P. Harvey, Serial No. 556,523, filed December 30, 1955.

It will be understood that the mechanism for driving the chain 39 rotating the intermediate gate operating cam 38 is so connected to that (not shown) for operating the walking board conveyor 16 and the receiving pan drive chain 13 that the intermediate gate leaves 31 and 32 descend to the open position shown in Figure 4 when the receiving pans 12 are in a proper position for having the lemons 22 fall into the center thereof and return to the closed position shown in Figure 3 before the walking board conveyer 16 reaches the position of its movable boards at which a lemon is lifted by the last and lowest movable board 59 so as to roll over the end stationary board 18 into the cup formed by the closed pair of intermediate gate leaves 31 and 32.

The shapes of the notches or valleys 21 in the walking board conveyer 16 are such in relation to the lemons 22 that the lemons roll around a longitudinal axis and therefore travel transversely to the longitudinal axis down the valleys in the walking board conveyer. However, when the lemon reaches the stationary board 18 and is lifted by the last movable board 59 so as to roll over the end board 18, it encounters the wing 19 on the end stationary board 18. This causes the lemon 22 to roll over the oblique edge 24 of the wing 19 instead of rolling in the manner in which it previously travelled so that it falls into the cup formed by leaves 31 and 32 with its axis oblique to the axes of the shafts 33 and 34 and it therefore takes a position illustrated at 61 in Figure 2 resting with its longitudinal axis lying along the slot or crevice 58 between the confronting edges 56, 57 of the intermediate gate leaves 31, 32.

Figure 2:
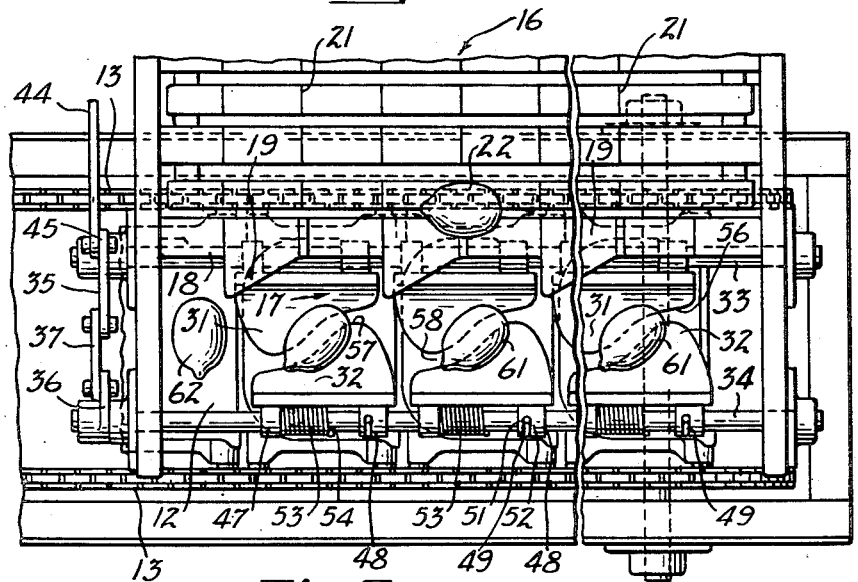
Figure 2 is a plan view of the portion of the sorting machine illustrated in Figure 1.

As the cam 38 rotates to cause the intermediate gate leaves 31 and 32 to open or fall to the position illustrated in Figure 4, the action of the asymmetric edges 56, 57 on the leaves 31 and 32 as the slot 58 opens obliquely gives the lemons in position 61 a further twist of the longitudinal axis so as to cause them to fall from the intermediate gate into the receiving pan 12 after a further 45° rotation of the longitudinal axis to assume the transverse position 62 illustrated in Figure 2.

Since the receiving pans 12 travel in a direction transverse to the direction of motion in the walking board 16, and parallel to the axes of the intermediate gate shafts 33, 34, the lemon 62 is again travelling with its longitudinal axis transvese to its direction of motion.

In accordance with the provisions of the patent statutes, the principle of operation of the invention has been described together with the apparatus now believed to represent the best embodiment thereof, but it is to be understood that the apparatus shown and described is only illustrative and that the invention may be carried out by other arrangements.

What we claim and desire to secure by Letters Patent of the United States is:

1. In a notched walking board conveyer for articles having a longitudinal dimension exceeding the lateral dimensions and tending to travel in the walking board conveyer transversely to the longitudinal dimension, a notched end board for the conveyer at the ejection end thereof, and in combination therewith a wing lying in a plane substantially parallel to the direction of motion of the articles in the conveyer and having an edge extending diagonally to the direction of motion for turning the longitudinal dimension of the article as it falls from the said end board.

2. An intermediate gate for a conveying system for receiving articles having a longitudinal dimension exceeding the lateral dimensions traveling in a path in one direction toward the gate and in a second path along a direction transverse thereto from the gate, said gate comprising a pair of cooperating leaves with adjacent edges adapted to approach for forming a cup into which an article may drop and opposite edges on pivot axes around which the leaves may turn and descend separating said adjacent edges to open the cup and deposit the article in a transverse path, said adjacent edges being unsymmetrical, extending further toward the opposite leaf on one side than the other and partially interfitting, whereby a diagonal slot is formed as the edges open to turn the article to a position with its longitudinal axis transverse to the transverse path as it is deposited thereon.

3. In a conveyer system for articles traveling in a predetermined direction having a longitudinal dimension transverse to the direction of travel and exceeding the lateral dimension, and employing a notched walking-board type of conveyer unit with an output end, the combination comprising a notched end board for the walking board conveyer at the output end thereof having a wing lying in a plane parallel to the direction of article travel in the walking board conveyer, and along one side of the notch in the end board, said wing having an edge extending diagonally to the direction of motion for turning the longitudinal dimension of the article as it falls from the said end board, and an intermediate gate below said end board for receiving articles falling therefrom and delivering them onto a path transverse in direction to the direction of travel in the walking board conveyer, said gate comprising a pair of cooperating leaves with adjacent edges adapted to approach for forming a cup into which an article may drop and opposite edges on pivot axes around which the leaves may turn downward, separating said adjacent edges to open the cup and deposit the article in the transverse path, said adjacent edges being asymmetric extending further toward the opposite leaf on one side than on the other and partially interfitting when the leaves are closed whereby a diagonal slot is formed as the edges open to turn each article to a position with its longitudinal dimension transverse to the transverse path as it is deposited thereupon.

4. A walking board conveyer comprising a plurality of interleaved relatively movable boards including an end board, and a wing secured to the end board, the boards having registering notches each with two sides sloping downward toward each other to receive articles of longitudinal dimension exceeding lateral dimensions and cause progressive movement of the articles from one board to the next in a direction toward the end board as relative movement of the boards takes place, said wing extending from one side of the notch in the end board and having an edge diagonal to the direction of movement of the articles for turning the axis of each article as it is caused to move over the end board.

5. An intermediate gate for a conveying system for receiving articles having a longitudinal dimension exceeding the lateral dimensions traveling in a path in one direction toward the gate and a second path along a direction transverse thereto away from the gate, said gate comprising a pair of cooperating separable leaves with diagonal adjacent edges substantially interfitting for forming a slot diagonal to said paths when the leaves are partially separated and turning the article axis when leaves are fully separated to drop the article from the gate between the leaves to said second path.

6. In a conveyer system for articles traveling in a predetermined direction having a longitudinal dimension transverse to the direction of travel and exceeding the lateral dimension, and employing a notched walking-board type of conveyer unit with an output end, the combination comprising an end board for the walking board conveyer at the output end thereof having a notch with two sides sloping downward toward each other to form a channel receiving an article being conveyed and having a wing extending from one side of said notch with an edge extending diagonally to the direction of motion for turning the longitudinal dimension of the article as it travels over said end board, and an intermediate gate below said end board for receiving articles falling therefrom and delivering them onto a path transverse in direction to the direction of travel in the walking board conveyer, said gate comprising a pair of cooperating separable leaves with adjacent edges diagonal to the direction of travel in the walking board conveyer and diagonal to the transverse path for forming a cup into which an article may be dropped, said edges substantially interfitting whereby a diagonal slot is formed when the leaves are partially separated, and when the leaves are fully separated to open the cup and release the article to the transverse path, the article is further turned to a position with its longitudinal dimension transverse to the transverse path as it is deposited thereon.

7. Transfer mechanism for transferring articles from parallel rows in a multiple row conveyer system to a single row conveyer, the articles traveling in the multiple row conveyer system in a predetermined direction to the ejection end and each having a longitudinal dimension transverse to the direction of travel and exceeding the lateral dimension, said transfer mechanism comprising in combination diagonal-edged diverters at the ejection ends of the rows of the parallel row conveyer system for partially turning the longitudinal dimension of articles leaving the parallel row conveyer system, and below each of said diverters an openable diagonal-edged two-part gate for receiving the articles falling from the diverters and further rotating the longitudinal dimension of the articles to deposit them in a single row of travel in the single row conveyer with axes transverse to direction of travel.

References Cited in the file of this patent

UNITED STATES PATENTS 2,728,443     Pike, et al.                Dec. 27, 1955